United States Patent
Mak et al.

(10) Patent No.: US 11,071,411 B2
(45) Date of Patent: Jul. 27, 2021

(54) METHODS AND SYSTEMS FOR FORMING VACUUM INSULATED CONTAINERS

(71) Applicants: Ronald K. Y. Mak, Shanghai (CN); Tinghong Chen, HuaiAn (CN); Jun Zhou, HuaiAn (CN); Marvin Lane, Wheeling, IL (US)

(72) Inventors: Ronald K. Y. Mak, Shanghai (CN); Tinghong Chen, HuaiAn (CN); Jun Zhou, HuaiAn (CN); Marvin Lane, Wheeling, IL (US)

(73) Assignees: THERMOS L.L.C., Schaumburg, IL (US); Thermos (China) Housewares Co., Ltd.

( * ) Notice: Subject to any disclaimer, the term of this patent is extended or adjusted under 35 U.S.C. 154(b) by 491 days.

(21) Appl. No.: 15/881,992

(22) Filed: Jan. 29, 2018

(65) Prior Publication Data

US 2019/0231145 A1     Aug. 1, 2019

(51) Int. Cl.
| | |
|---|---|
| B23K 26/10 | (2006.01) |
| B23Q 3/00 | (2006.01) |
| B23K 26/282 | (2014.01) |
| A47J 41/02 | (2006.01) |
| B23K 101/12 | (2006.01) |

(52) U.S. Cl.
CPC ............. *A47J 41/02* (2013.01); *B23K 26/10* (2013.01); *B23K 26/282* (2015.10); *B23Q 3/00* (2013.01); *B23K 2101/12* (2018.08)

(58) Field of Classification Search
CPC .. B23K 26/282; B23K 26/10; B23K 2101/12; B23Q 3/00; B65D 7/22; B65D 7/40; B65D 7/12; A47J 41/022
See application file for complete search history.

(56) References Cited

U.S. PATENT DOCUMENTS

| | | | |
|---|---|---|---|
| 4,527,042 A | 7/1985 | Shinohara et al. | |
| 5,153,977 A * | 10/1992 | Toida | B23K 1/001 228/176 |
| 6,264,092 B1 * | 7/2001 | Yasuda | E04B 1/803 228/161 |
| 2014/0339205 A1 | 11/2014 | Mak et al. | |

FOREIGN PATENT DOCUMENTS

| | | |
|---|---|---|
| CN | 202726317 U | 2/2013 |
| CN | 104128704 A | 11/2014 |
| CN | 104891051 A | 9/2015 |
| CN | 107598377 A | 1/2018 |

OTHER PUBLICATIONS

PCT/US2019/014722 International Search Report and Written Opinion dated Mar. 26, 2019 (12 pages).
Taiwan Patent Application No. 108103235 Office Action dated Oct. 24, 2019 (translation 4 pages).

* cited by examiner

*Primary Examiner* — Janie M Loeppke
(74) *Attorney, Agent, or Firm* — Polsinelli PC

(57) ABSTRACT

Methods and systems for forming vacuum insulated containers, such as beverage and food containers, are described. The methods and systems include using a laser to close openings in walls of the container while the container is held at vacuum conditions. The closing of the opening forms the vacuum space within the walls of the container.

25 Claims, 11 Drawing Sheets

METHODS AND SYSTEMS FOR FORMING VACUUM INSULATED CONTAINERS

FIELD OF INVENTION

The present invention relates to methods and systems for forming vacuum insulated containers, such as beverage and food containers.

BACKGROUND

Vacuum insulated beverage and food containers generally have a vacuum space defined by inner and outer shells of the container. The vacuum space provides thermal insulation to the container. Existing methods of forming such containers typically use a solder material to seal the vacuum space between the inner shell and the outer shell. The solder material may include a glass material that will melt and adhere to the outer shell.

During production of vacuum insulated beverage and food containers using such existing methods, a dimple or other depression is usually formed in a bottom surface of the outer shell or a bottom shell of the container. An opening through the outer shell is then formed in the dimple. The solder material is placed over the opening. The container (with the solder material over the opening) is then placed in a vacuum oven, where ambient pressure around the container is lowered and a temperature in the vacuum oven is raised. The vacuum oven creates a vacuum state in and around the unfinished container. When the temperature in the oven rises to or above a melting point of the solder material, the solder material melts and flows about the opening in the dimple to close the opening. The melted solder seals the opening and the vacuum within the space between the inner shell and the outer shell—namely, the intershell space. The temperature in the oven is reduced, and the melted solder cools and hardens over the opening. As the intershell space is now sealed within the container by the solder material, the container may now be removed from the vacuum oven for further finishing.

The existing methods use much energy to provide the heat needed to melt the solder material. Further, the existing method is slow—as much time is needed for the oven to heat and for the oven to cool. Further, the existing methods generally require a flat surface on the container that is held parallel to a horizontal plane during the vacuum forming process in order for the melted solder material to fill the opening in the dimple. It is difficult to seal an opening in a vertically oriented surface of the container, since the solder material is likely to fall or drip off of the container. In addition, in existing methods, it is difficult to seal a curved or otherwise non-linear surface. Further, in the existing methods, additional cap structures are often used for aesthetic purposes to cover or hide the dimple and the hardened solder material. Further, in the existing methods, the physical structure of the dimple passing inward from the outer shell toward the inner shell requires extra space between the outer shell and the inner shell in order to maintain integrity of the vacuum space—this extra space for the vacuum space may limit or decrease an overall size of the container.

SUMMARY

Certain embodiments of methods and systems for forming vacuum insulated containers are shown and described. The methods and systems use a laser to seal or weld closed an opening to an intershell space of the container while the container is maintained in a vacuum environment. The vacuum environment may be formed in a container holding element, which is sized and shaped to enclose part of the container or all of the container. The container holding element may be made from a material sufficient to maintain a vacuum within its interior. Examples of a container holding element include a vacuum chamber, vacuum fixture, or any other unit configured for this purpose.

In one aspect, the method includes joining an inner shell and an outer shell together to form an unfinished container. The method includes creating one or more openings in the outer shell of the unfinished container. The method includes placing the unfinished container in a container holding element and drawing a vacuum throughout the inside of the container holding element and around or about the unfinished container. The method includes lowering pressure around the unfinished container. The method includes passing a laser through a window of the container holding element and welding closed the one or more openings to seal the vacuum in a vacuum space between the inner shell and the outer shell of the container. In any step, welding may be replaced by any other method known in the art configured to close an opening of the container, depending on the material from which the container is made.

The vacuum space has a low pressure and is formed in between the inner and outer shells. The vacuum space provides insulation for the container. During the process, the whole unfinished container may be placed inside of the container holding element. The unfinished container may be completely enclosed or partially enclosed by the container holding element.

In another aspect, the method includes welding inner shells and outer shells together to form unfinished containers with a vacuum space between the inner shell and the outer shell. The method includes creating one or more openings in the outer shell with a laser, with the openings connecting to the vacuum space. The method includes placing the unfinished containers in a container holding element, without adding additional heat, and drawing a vacuum around the unfinished containers. The method includes lowering pressure around the unfinished containers to a desired level. The method includes pulling a vacuum through the one or more openings. The method includes passing a laser through a window of the container holding element and welding closed the one or more openings to seal the vacuum in the chamber between the inner shell and the outer shell to form a vacuum space between the inner and the outer shells. As the methods form the vacuum space at ambient or room temperatures, energy savings may be achieved.

In another aspect, a stainless steel shell bottom is first welded up without any hole in a bottom. Then, a beam of laser is applied to cut one or more slits in the bottom. Next, the stainless steel shell bottom is placed inside of a container holding element with a transparent window. Next, a vacuum is pulled through the slit in the shell bottom in the container holding element generally at room temperature. After attaining the desired vacuum level, a laser from outside the container holding element shoots through the transparent window and welds up the slit. After the shell is removed from the container holding element, the shell may optionally be put in an oven (at atmospheric pressure) to activate a getter inside of the shell. The transparent window in the container holding element may be made from glass or any other material having properties sufficient to permit the laser to pass therethrough to reach the container that also permit the desired vacuum level to be maintained in the container holding element.

The methods and systems may be used to form a variety of insulated containers. For example, the containers may be a two-piece design, four piece design, or other designs. A two piece design generally includes an inner shell and an outer shell. The four piece design general includes an inner shell, an inner bottom shell, an outer shell, and an outer bottom shell. The containers may be used to store hot or cold beverages, food products, or other consumer products. The containers may be beverage containers, beverage tumblers, jugs, food jars, carafes, pump pots, sippy cups, can insulators, etc.

Optionally, the methods include removing the containers from the vacuum space and heating the container in an oven, at atmospheric pressure, to activate a getter container within the vacuum space. The getter may remove any oxygen or other residual molecules from any air left in the vacuum space.

The methods and systems may form and close the one or more openings on any location of the container that is accessible by the laser beam. For the example, the one more opening may be on the sides, bottom surfaces, interior or exterior edges, or interior surfaces of the container. The methods and system utilize laser welding techniques or other laser implemented methods that do not require a solder material that is placed over the region of the container that is to be sealed.

The methods and systems of the present disclosure form vacuum insulated containers faster and more efficiently than prior methods. As no heating is required, the methods and systems of the present disclosure utilize much less energy than prior methods. Further, the one or more openings may be formed anywhere on or in the container that the laser can reach, which permits strategic placement of the opening. There may be some strategies to hide the opening, for example, along an edge of the container. Other strategies include placing the opening to correspond with a design of the container. Further, the one or more openings that have been sealed by the present method may be painted over. In addition, the one or more openings that have been sealed using the present method are often stronger and less likely to sustain breakage than a traditional solder-type closing. This reduces the need for a further cap or structure to cover the soldered opening formed in the prior methods. Also, since the current method does not require solder, this reduces materials needed as well.

In another aspect, a method for forming a vacuum insulated container is described. The method includes joining an inner shell and an outer shell together to form an unfinished container, wherein the unfinished container has a vacuum space between the inner shell and the outer shell. The method includes creating one or more openings in the outer shell of the unfinished container. The method includes placing the entire unfinished container inside of a container holding element. The method includes drawing a vacuum around the unfinished container. The method includes lowering a pressure around the unfinished container to a desired level. The method includes pulling a vacuum through the one or more openings. The method includes directing a laser beam through the container holding element and welding closed the one or more openings to seal the vacuum in the space between the inner shell and the outer shell to form a vacuum space between the inner shell and the outer shell.

In another aspect, a method for forming vacuum insulated containers is described. The method includes joining inner shells and outer shells together to form a plurality of unfinished containers, wherein each unfinished container has a space between the inner shell and the outer shell. The method includes creating one or more openings in the outer shell of each of the unfinished containers. The method includes placing the plurality of the unfinished containers in an interior of a container holding element. The method includes closing the container holding element with a cover. The method includes drawing a vacuum in the interior of the container holding element and around the unfinished containers. The method includes lowering a pressure around the unfinished containers to a desired level. The method includes pulling a vacuum through the one or more openings. The method includes directing a laser beam through the cover of the container holding element and welding closed the one or more openings of a first container of the plurality of containers to seal the vacuum in the space between the inner shell and the outer shell of the first container to form a vacuum space between the inner shell and the outer shell of the first container. The method includes moving a source of the laser beam to a second container of the plurality of containers to seal the vacuum in a space between the inner shell and the outer shell of the second container to form a vacuum space between the inner shell and the outer shell of the second container.

In another aspect, a system for forming vacuum insulated containers is described. The system includes a container holding element defining an interior. The interior is configured to hold a plurality of containers. The container holding element includes a base and a cover. The cover is configured to sealingly engage to the base. A vacuum source is in connection with the container holding element. The vacuum source is configured to draw a vacuum in an interior of the container holding element to simultaneously reduce pressure around all of the plurality of containers. A laser source is configured to direct a laser beam through the cover. The cover allows the laser beam to pass into an interior of the container holding element and reach the container.

In another aspect, a system for forming vacuum insulated containers is described. The system includes a housing to position a plurality of container holding elements. The system includes a mounting element proximate the plurality of container holding elements. The mounting element includes a horizontal track and a vertical track. The container holding elements are configured to each hold a container. The container holding elements include a cover. A vacuum source is in connection with the container holding elements. The vacuum source is configured to draw a vacuum in the interiors of the container holding elements. A visual detection and laser welding assembly is mounted to the mounting element to move the visual detection and laser welding assembly horizontally and vertically. The visual detection and laser welding assembly includes a laser configured to direct a laser beam through the covers. The covers allow the laser beam to pass into interiors of the container holding elements.

In another aspect, a container holding element for forming vacuum insulated containers is described. The container holding element includes a base. The base includes a generally square shape or generally rectangular shape with four side walls. The four side walls extend generally upwardly from a bottom of the base to define an interior of the container holding element. A cover sealingly engages to a top of the base to close the interior. A rack is configured to hold a plurality of the containers. The rack is shaped to fit into the interior of the base. The bottom of the base includes a vacuum port configured to engage with a vacuum source.

DETAILED DESCRIPTION

Figure 1:
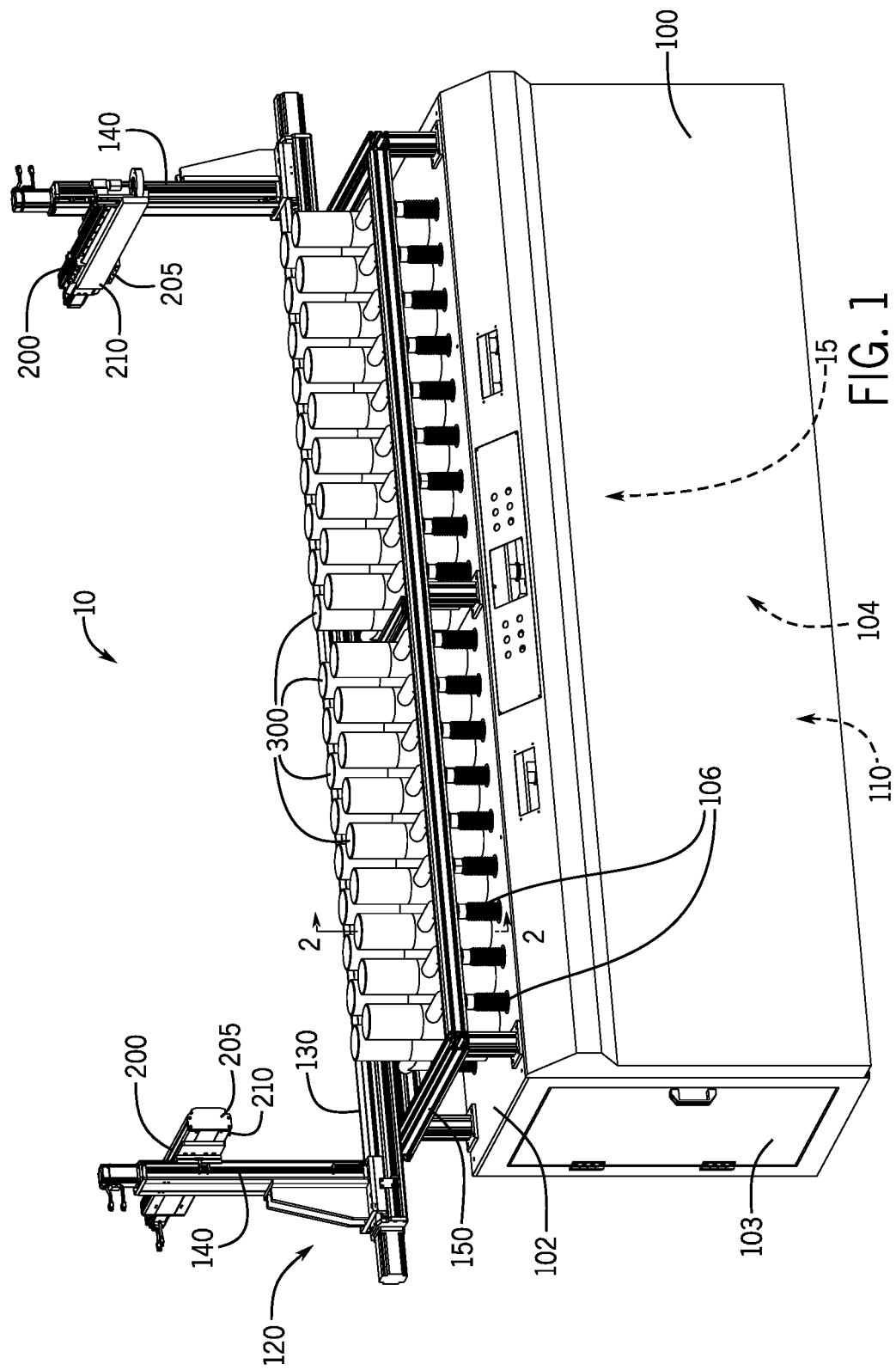
FIG. 1 is perspective view of an embodiment of the system for forming vacuum insulated containers.

For purposes of this application, any terms that describe relative position (e.g., "upper", "middle", "lower", "outer", "inner", "above", "below", "bottom", "top", etc.) refer to an embodiment of the invention as illustrated, but those terms do not limit the orientation in which the embodiments can be used.

A system 10 will now be described with reference to FIGS. 1-6B. The system 10 directs a laser beam from a laser source 205 through a container holding element 300 to weld up an opening 52 in a container 50 that is within the container holding element 300.

The system 10 includes a housing 100. The housing 100 comprises a visual detection and laser welding assembly 200 that positions the laser source 205 proximate to the container holding element 300. The visual detection and laser welding assembly 200 may be mounted to the housing 100 as shown in FIG. 1. In others aspects, the visual detection and laser welding assembly 200 may be positioned over or supported proximate to the housing 100.

The housing 100 may define a space in which a vacuum source 110 is positioned. The vacuum source 110 is connected to the container holding element 300 by bellows or other conduit, and is configured to draw the vacuum inside of the container holding element 300. An example of a vacuum source 110 is a vacuum pump. The vacuum source 110 creates the vacuum for the container holding element 300 that lowers the pressure in the container holding element 300. In other aspects, the vacuum source 110 may be positioned proximate the housing 100 and connected to the container holding element 300 by additional bellows or other conduits.

The visual detection and laser welding assembly 200 includes the laser source 205 to emit laser pulses to weld the one or more openings 52. The visual detection and laser welding assembly 200 further includes a detector 210 to register the pulses from the laser source 205 with the openings 52 of the containers 50. The system 10 includes a controller 15 to operate at least certain elements of the system 10. The controller 15 may include a programmable logic controller. For example, the controller 15 may cause turning on, turning off, moving, calibrating or otherwise directing any or all of the laser source 205, the detector 210, or the vacuum source 110.

The container holding element 300 receives the container 50 into an open interior 310 of the container holding element 300. A lower portion 320 of the container holding element 300 includes a positioner 325 to hold the container 50. In other embodiments not illustrated, a positioner 325 could be present in any orientation configured to properly position the container 50 for access by the laser source 205. For example, in another embodiment, the positioner 325 may include a hook from which the container 50 may hang for a laser source 205 positioned below the container holding element 300.

The container holding element 300 includes a window 350 made from, for example, an optical glass. The window 350 may be made from any optical glass that allows sufficient light energy from the laser source 205 to pass into the interior 310. The window 350 may be made from other materials that allow for transmission or passage of the light energy and permit the vacuum to be drawn within the container holding element 300. The window 350 separates the interior 310 from the ambient environment of the system 10. In the aspect shown, the laser source 205 is external to the container holding element 300. The laser beam from the laser source 205 passes through the window 350 and to the container 50 in the interior 310 of the container holding element 300. In aspects in which the laser source 205 is positioned inside the container holding element 300, a window 350 would not be necessary. In the illustrated aspect, the window 350 forms the cover of the container holding element 300, but such window could be positioned anywhere on the container holding element 300.

During production, the vacuum is formed within the interior 310 of the container holding element 300 by the vacuum source 110. In the aspect shown, the container holding element 300 includes an upper portion 330 and the lower portion 320 that are removably connected. For example, the upper portion 330 may be removed from the lower portion 320 for inserting the container 50 into the container holding element 300. For example, the upper portion 330 may seal to the lower portion 320 via a threaded, frictional, press-fit, or other mechanical connection that holds the upper portion 330 and the lower portion 320 together and to provide for the vacuum to form in the interior 310 of the container holding element 300. Gaskets or other pliable seals may be used between the upper portion 330 and the lower portion 320 to seal the interior 310 such that the vacuum may be formed in the interior 310. In other aspects, the cover 300 provides access to the interior 310 of the fixture 300. For example, the cover 300 may be temporarily removed from the container holding element 300 in order to place the container 50 in the interior 310 of the container holding element 300.

The lower portions 320 of the container holding elements 300 may be securely fastened to the frame 150 and/or the housing 100. The lower portions 320 generally remain fastened to the frame 150 and/or the housing 100 during operation of the system 10 and/or during the loading and unloading of the containers 50 into the lower portions 320. The lower portions 320 may pass through openings 106 in an upper surface 102 of the housing 100 and into an interior 104 of the housing 100.

Figure 2:
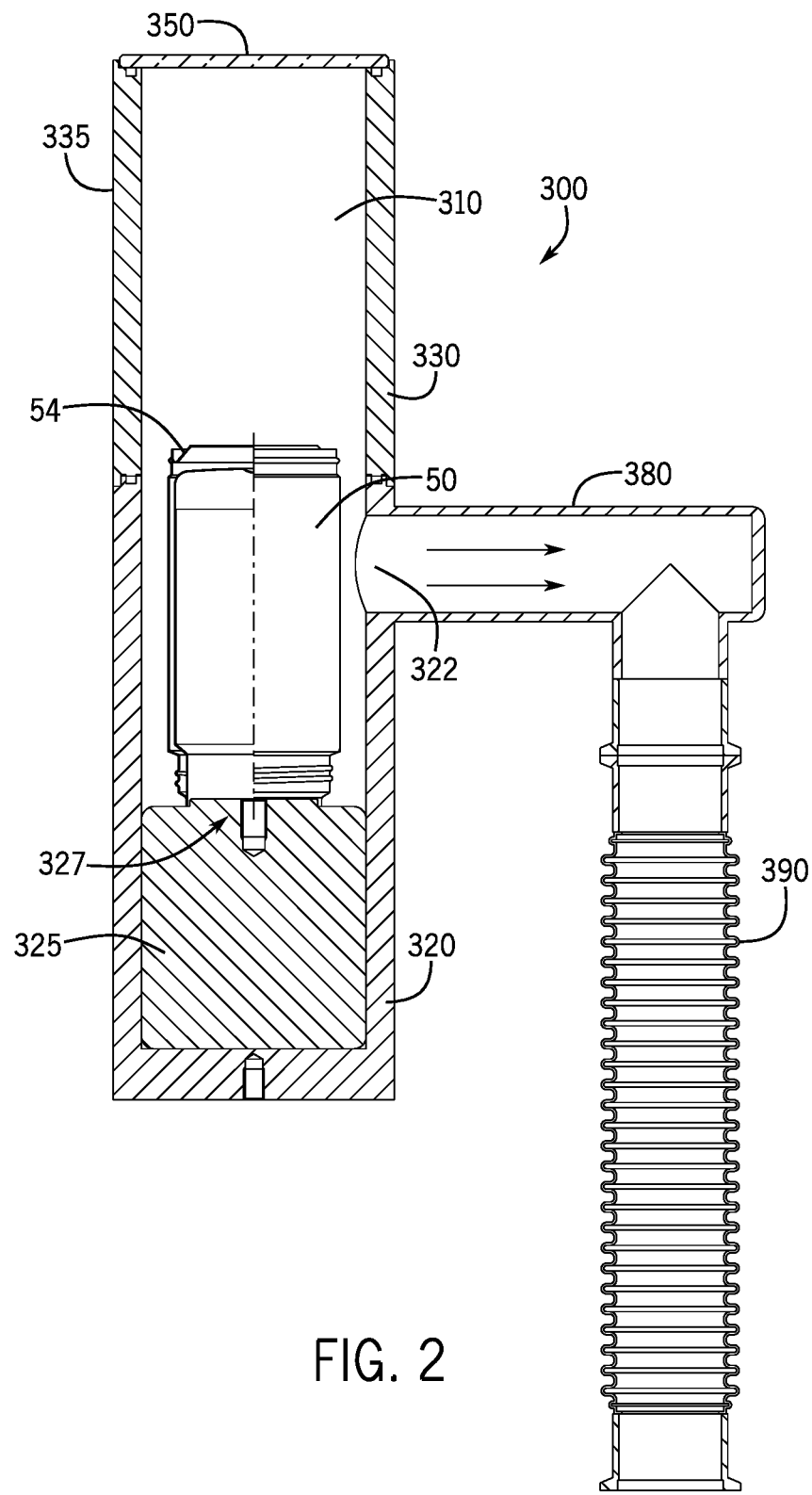
FIG. 2 is a sectional view of a first embodiment of the container holding element of the system for forming vacuum insulated containers.
Figure 3:
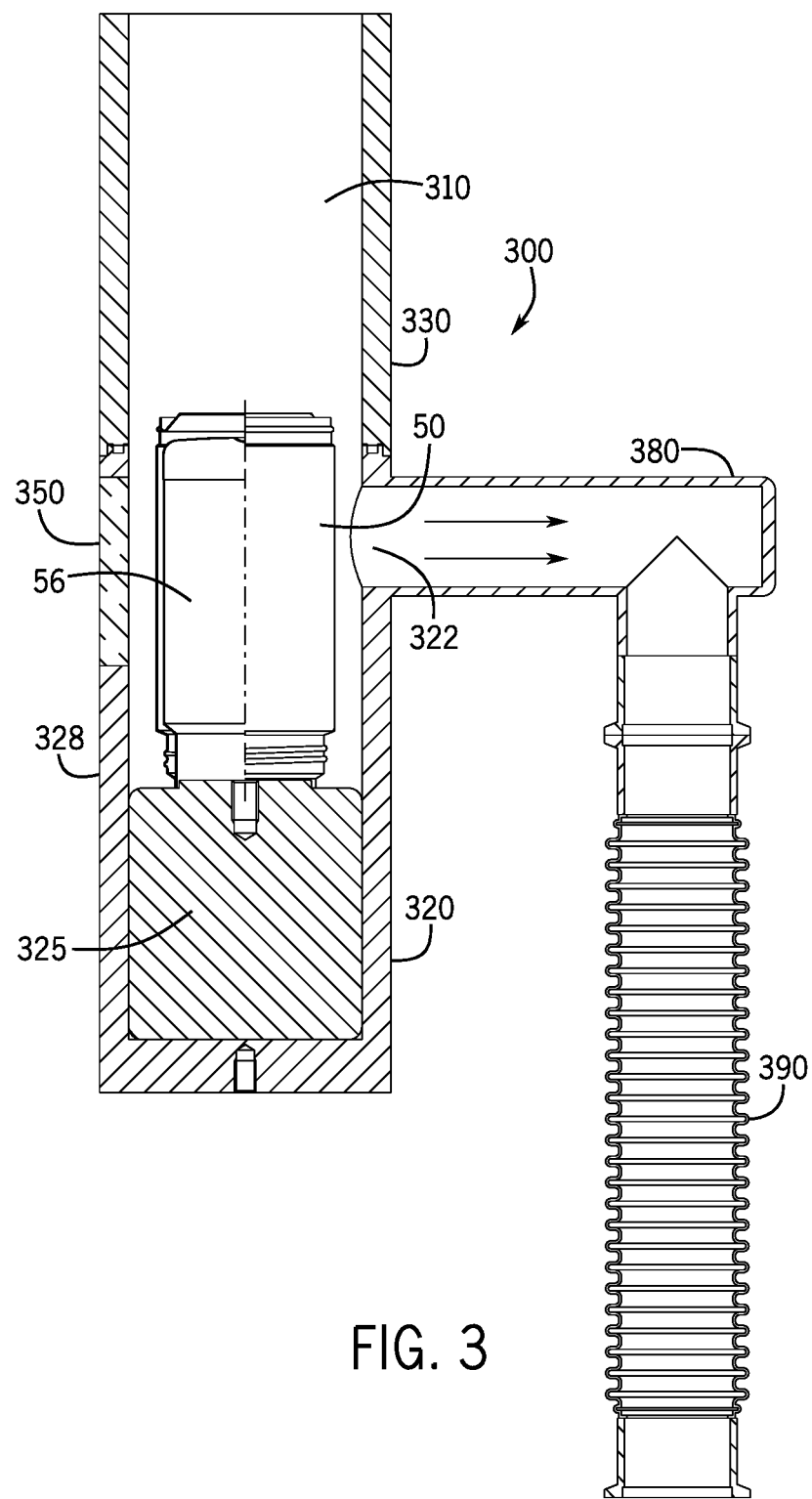
FIG. 3 is a sectional view of a second embodiment of the container holding element of the system for forming vacuum insulated containers.
Figure 4:
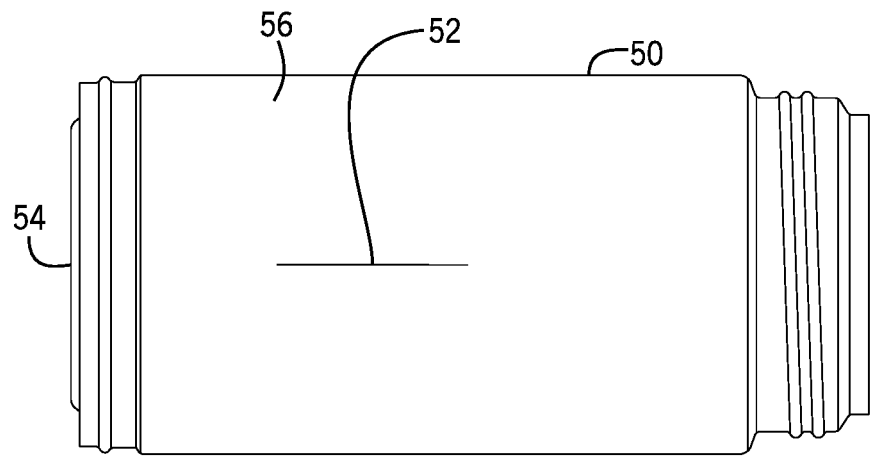
FIG. 4 is a view of the slit of a first embodiment of the container.
Figure 5:
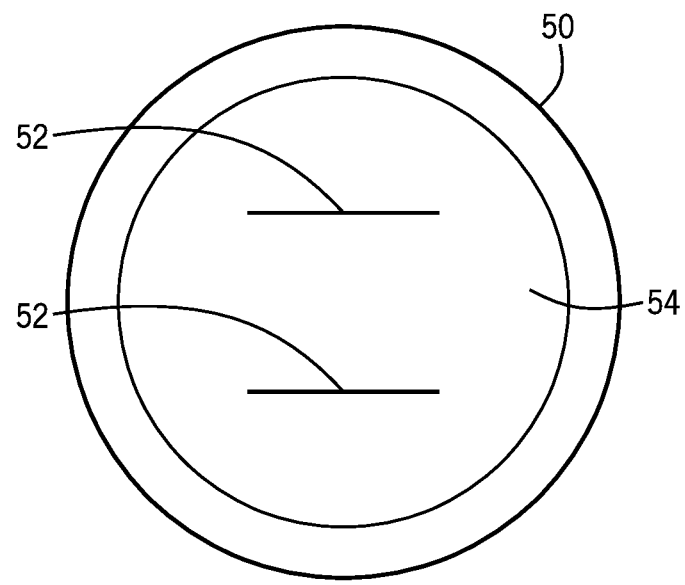
FIG. 5 is a view of the slits of a second embodiment of the container.
Figure 6A:
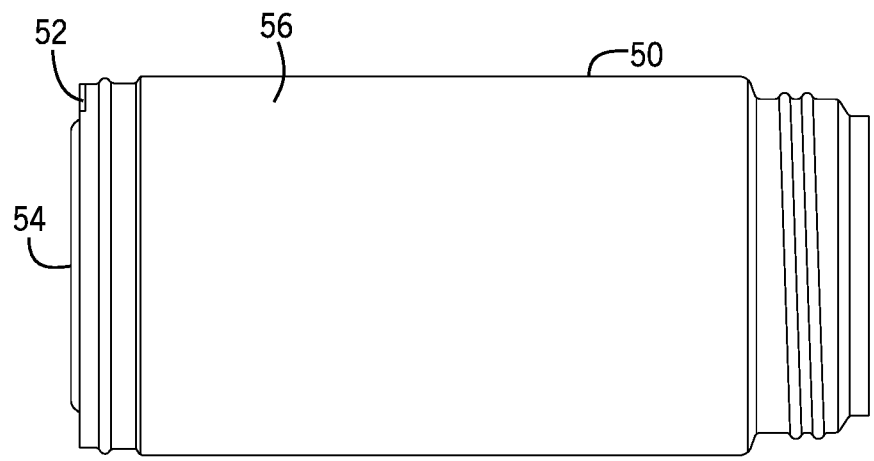
FIG. 6A is a view of the slit of a third embodiment of the container.
Figure 6B:
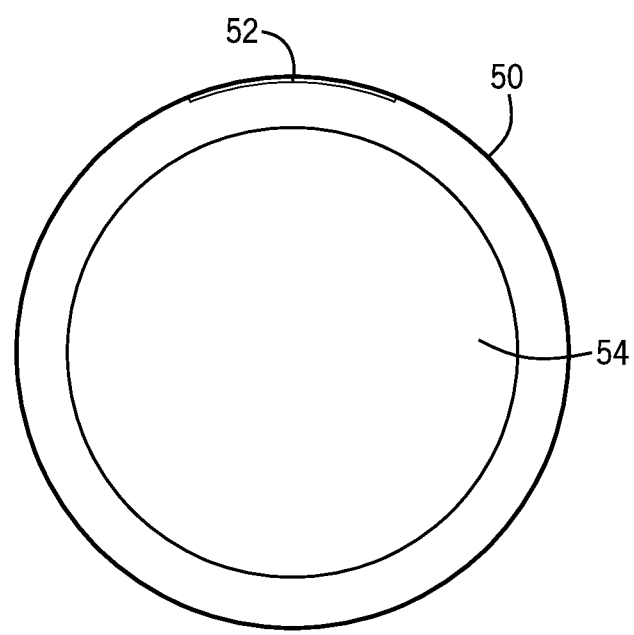
FIG. 6B is a view of the slit of the third embodiment of the container.
Figure 7:
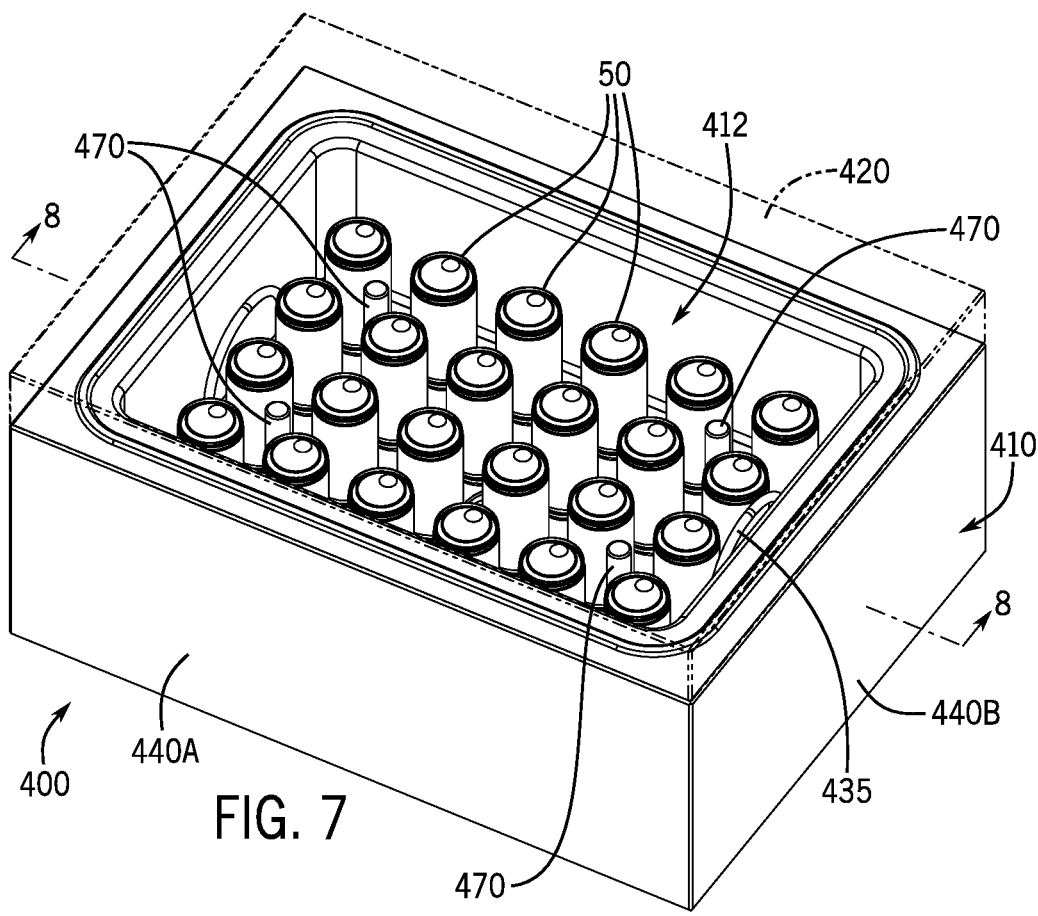
FIG. 7 is a top perspective view of the container holding element for holding a plurality of containers.

In the aspect shown in FIG. 2, the window 350 is positioned at an upper end 335 of the container holding element 300. In the aspects shown, the container 50 is held by the positioner 325 in an inverted position. This provides for the system 10 to form the openings 52 in a bottom 54 of the container 50. The openings 52 are shown in FIG. 5. In the aspect shown in FIG. 3, the window 350 is positioned in a side wall 328 of the container holding element 300. As shown in FIG. 4, this provides for the system 10 to form the openings 52 in a side 56 of the container 50, i.e., the laser source 205 is welding the openings 52 that are in a non-horizontal portion of the container 50. The laser source 205 may weld the opening 52 that are in nearly any orientation—since no solder is needed to be used on the opening 52. For example, FIGS. 6A and 6B illustrate the opening 52 along an edge between the bottom 54 and the side 56 of the container 50. Of course, the opening 52 may formed along any other edge of the container 50.

The positioner 325 may include an extension 327 that fits into an interior of the container 50. In other aspects, the positioner 325 may include threads to threadably engage with complementary threads of a mouth of a container 50. The positioner 325 holds the container 50 steady during the laser welding process.

During the forming process, the unfinished containers 50 are placed completely inside of the container holding element 300. The unfinished containers 50 are completely enclosed by the container holding element 300. For example, a container 50 may have a two piece design with an inner shell and an outer shell. During the forming process, both the inner shell and the outer shell may be completely contained inside of the container holding element 300. For example, a four piece design may have an inner shell, an inner bottom shell, an outer shell, and an outer bottom shell. During the forming process, all of the inner shell, the inner bottom shell, the outer shell, and the outer bottom shell may be completely contained inside of the container holding element 300.

The container holding element 300 includes a conduit 380 leading to a bellows 390, which are in communication with the vacuum source 110. The container holding element 300 may include pressure sensors to monitor the pressure of the interior 310 of the container holding element 300. In the aspect shown, the conduit 380 joins the bellows 390 with a conduit opening 322 in the lower portion 320 of the container holding element 300. The conduit opening 322 provides passage into the interior 310 of the container holding element 300. Opposite of the conduit 380, the bellows 390 lead to the vacuum source 110. The vacuum source 110 creates the vacuum for the container holding element 300 that lowers the pressure in the container holding element 300 and around or about the openings 52 of the containers 50.

The housing 100 supports a mounting element 120 configured to position the visual detection and laser welding assembly 200. The mounting element 120 may move the visual detection and laser welding assembly 200 in the X (generally horizontal) and the Y (generally vertical) directions to weld the openings 52 of the containers 50. The illustrated aspect of the mounting element 120 includes a horizontal track 130 and a vertical track 140. The visual detection and laser welding assembly 200 moves up and down on the vertical track 140. The vertical track 140 moves left and right on the horizontal track 130. The mounting element 120 may be mounted to the upper surface 102 of the housing 100. After initial set up, the visual detection and laser welding assembly 200 may only need to move in the horizontal plane in order to laser weld the containers 50. Non-illustrated aspects of a mounting element 120 may include a pivotable section, a mechanical arm, or any other configuration sufficient to properly support and position the visual detection and laser welding assembly 200. Other aspects may include a separate mounting element 120 for each of the laser source 205 and the detector 210.

The controller 15 operates the function and movement of the mounting element 120. The controller 15 may further include a display and user input controls. The illustrated housing 100 further includes a door 103 leading to the interior 104 of the housing 100. The vacuum source 110 may be positioned in the interior 104 underneath the container holding elements 300.

In the aspect shown, the system 10 includes two visual detection and laser welding assemblies 200 on separate vertical tracks 140. The separate vertical tracks 140 move independently on the horizontal track 130. In other aspects, the system 10 may include a single visual detection and laser welding assembly 200 or any number of additional visual detection and laser welding assemblies 200.

The housing 100 further includes the frame 150 to hold and/or position the container holding elements 300. The frame 150 may be mounted to the upper surface 102 of the housing 100 adjacent to or supporting the mounting element 120.

The vacuum source 110, such as a pump, is positioned in or proximate the housing 100. The vacuum source 110 draws the vacuum used to form the vacuum spaces within the containers 50. One or more containers 50 are placed in the container holding elements 300. The vacuum source 110 begins drawing a vacuum. The detector 210 determines the position of the openings 52 in order to direct the pulses from the laser source 205 to the openings 52. When a sufficient or desired pressure is reached in the container holding element 300, the laser source 205 welds the one or more openings 52 closed. The visual detection and laser welding assembly 200 moves to the next container 50 in a container holding element 300.

The vacuum source 110 draws the vacuum in the container holding element 300 and in the vacuum space of the container 50. The air pressure may be reduced from ambient pressure conditions to approximately 10-3 tor to approximately 10-4 tor depending on the materials used for the container 50 or other variables as needed. During the forming process, the whole unfinished container 50 is placed inside of the container holding element 300. The unfinished container 300 is completely enclosed by the container holding element 300.

The controller 15 may direct the movement of the visual detection and laser welding assembly 200 to the respective container holding elements 300. The detector 210 is in communication with the controller 15 to determine the positioning of the openings 52. The controller 15 may modulate the positioning of the laser welding assembly 200 based on input from the detector 210. The controller 15 also monitors pressure of the container holding elements 300 via sensors internal to the container holding elements 300 or by readings obtained from the vacuum source 110. The controller 15 may modulate the operation of the vacuum source 110 to obtain the desired vacuum pressures in the container holding elements 300. When the desired position of the laser source 205 relative to the container 50 and the desired vacuum pressure in the container holding element 300 are achieved, the controller 15 will activate the laser source 205 to weld the opening 52.

The controller 15 may move or change the orientation of the laser source 205 to direct the laser energy at a full length of the opening 52. For example, the mounting element 120 may move the laser source 205, while the laser source 205 is emitting laser energy, over the full length of the opening 52. In some aspects, after one opening 52 is sealed, the mounting element 120 may move the laser source 205 to seal another opening 52 on the same container 50. After one container 50 is sealed, the mounting element 120 may move the laser source 205 to successive containers 50 for sealing their openings 52. As such, the system 15 may serially seal the openings 52 of a batch of the containers 50.

The methods and systems 10 may include an optional pre-heating step or stage that vaporizes any surface moisture on or in the container 50. Such surface moisture may lead to discoloring or interfere with further processing. In dry conditions, the pre-heating may not needed. If the pre-heating is employed, the unfinished container 50 is placed in oven and the temperature is raised to approximately 150° C. to approximately 200° C. for a suitable time period to remove the moisture.

The laser source 205 may form one or more openings 52 anywhere on the container 50, for example: on the edges, outer shell, inner shell, and/or the bottom outer shell of the container 50. The one or more openings 52 may include slits, geometrically shaped openings, and/or amorphously shaped openings. The one or more openings 52 may vary in length, width, size, etc. depending on the container 50, the laser source 205 used to close the one or more openings 52, the material of the container 50, the size of the container 50, etc. In one aspect, the openings 52 include two slits of that are approximately 20 mm in length and having a width of approximately 0.1 mm to approximately 0.15 mm on the bottom outer shell of the container 50. Although the two slits 52 are shown in a parallel configuration, the two slits 52 may be in other angular or spaced relationships with respect to each other.

Any type of laser with a proper wavelength may be used for the laser source 205. The laser source 205 may be pulse or continuous. The laser source 205 may also simultaneously emit two laser beams to simultaneously seal two openings 52 on the container 50. The laser source 205 may also emit an array of laser beams to seal a matching pattern of openings 52 on the container 50.

The controller 15 operates the function of the system 10. The controller 15 may be programmed via computer numerical control program in order to move the laser source 205 to successive container holding elements 300 A position of each container holding elements 300 is programmed into the controller 15. The laser source 205 moves from position to position in order to weld the openings 52. The detector 210 may include a photo-eye, orientation sensor, or other sensor to ensure that the laser source 205 is in proper position to weld the openings 52. The controller 15 may modulate the positioning of the laser welding assembly 200 based on input from the detector 210. The controller 15 also may monitor pressure of the container holding elements 300. The controller 15 may be programmed to confirm that the pressure levels within the container holding elements 300 are acceptable before activating the laser source 205.

The methods and system 10 may be used with, for example, containers made from stainless steels, PE, TX2001, or other metals and metal alloys.

The system 10 may include one or more container holding elements 300. For example, the system 10 illustrated includes 36 individual container holding elements 300. During operation, the vacuum source 110 may form a vacuum in all of the container holding elements 300 at the same time. Thus, the laser source 205 may immediately move on to the next container holding element 300 as soon as the openings 52 of a container 50 in a prior container holding element 300 are welded closed. In other aspects, the vacuum source 110 may form a vacuum in some of the container holding elements 300 simultaneously.

In other aspects, the system 10 may employ fewer or additional container holding elements 300. For example, the system 10 may include a single container holding element 300, 24 container holding elements 300, or any other number of container holding elements 300.

In other aspects, the system 10 may include a laser that is fixed in position. The containers 300 may be serially sealed by the laser.

In other aspects, a single container holding element 300 may have a larger volume capable of holding several containers 50. The laser source 205 may move around or proximate to the single container holding element 300 to weld the containers 50 therein.

In others aspects, the welding gun or the laser may be incorporated inside of the vacuum space of the container holding element.

FIGS. 7-10 show a container holding element 400 for holding a plurality of containers 50 for processing. The container holding element 400 may be incorporated onto the system 10 of FIGS. 1-6B or other suitable systems. The plurality of containers 50 may be completely placed inside of the container holding element 400.

The container holding element 400 allows the user to simultaneously apply a vacuum to the plurality of the containers 50. A batch of the containers 50 may be loaded into the container holding element 400, and the pressure inside of the container holding element 400 may be lowered—thus lowering the ambient pressure around each of the containers 50 in the batch of the containers 50. This provides for the ambient pressure around multiple containers 50 to be lowered in a single step or process. This increases efficiency by reducing wait time between laser welding steps of the containers 50, as the laser source 205 may move to successive containers 50 without waiting for a further vacuum to be formed.

The laser source 205 or other laser may be used to weld the one or more openings in the containers 50. The container holding element 400 allows for the user to lower the pressure around the batch of the containers 50, maintain the lowered pressure around the batch of the containers 50, and then serially weld each of the containers 50 in the batch of the containers 50. The laser source 205 or other laser may move on to the next container 50 in the container holding element 400 after the one or more openings in a first container 50 are welded. The laser source 205 or other laser may move on to successive containers 50 after the one or more openings in a prior container 50 are welded. There is generally no need to reduce pressure and/or open the container holding element 400 between the welding of the individual containers 50 in the plurality of the containers 50.

The container holding element 400 includes a base 410 and a cover 420. The cover 420 seals the base 410 to a closed and generally air-tight position. In certain aspects, the cover 420 also is the window, while in other aspects, the cover 420 may be opaque and a window is formed in another portion of the container holding element 400. The base 410 defines a generally open interior 412 that receives the containers 50. A rack 430 or other suitable transport device may be loaded with a plurality of the containers 50 and then lowered into the interior 412 of the base 410 of the container holding element 400.

The rack 430 may include one or more openings 438 that receive one or more positioners 470 to align the rack 430 in the interior 412 of the base 410. The positioners 470 may pass through the one or more openings 438 in the rack 430. The positioners 470 may extend upwardly from a bottom 460 of the base 410 of the container holding element 400. In the aspect shown, the base 410 includes four positioners 470, although fewer or additional positioners 470 may be employed. The rack 430 may also include two oppositely disposed handles 435 to assist in the placement and withdrawal of the rack 430 from the base 410 of the container holding element 400.

The base 410 may include a generally square or rectangular shape with four side walls 440A, 440B, 440C, and 440D. The side walls 440A-440D extend upwardly from the bottom 460 to define the interior 412. The base 410 may be made from rigid or durable material, such as solid aluminum or other metal alloy, which withstands the vacuum forces applied during the vacuum and sealing steps. The side walls 440A-440D of the base 410 may form a cross-section just larger than a cross-section of the rack 430, such that the rack 430 nests within the side walls 440A-440D. In the aspect shown, the side wall 440A forms a front side, the side wall 440B forms a right side, the side wall 440C forms a rear side, and the side wall 440D forms a left side. In the aspect shown, the side walls 440A and 440C form longer sides than the side walls 440B and 440D.

An upper surface 432 of the rack 430 may include one or more positioning devices or other engaging members that hold the containers 50 in position on the rack 430. For example, the container 50 may frictionally fit over a pliable support or positioner to hold the position of the containers 50 on the rack 430. In other aspects, the containers 50 may threadably engage or removably fit to the upper surface 432 of the rack 430. The rack 430 is lowered into the interior 412 of the base 410 and rests on an upper surface 468 of the bottom 460 of the base 410.

The rack 430 may hold the containers 50 in a matrix or grid fashion. In the aspect shown, the containers 50 are arranged in six columns and four rows for a total of twenty-four containers 50. Of course, in other aspects, fewer or additional columns and/or rows may employed in the container holding element 400, and/or fewer or additional containers 50 may be processed in the container holding element 400. The container holding element 400 may also be scaled upwards or downwards in size to change the processing capacity of the container holding element 400. The container holding element 400 may be adapted or adaptable for various container sizes or shapes.

Figure 8:
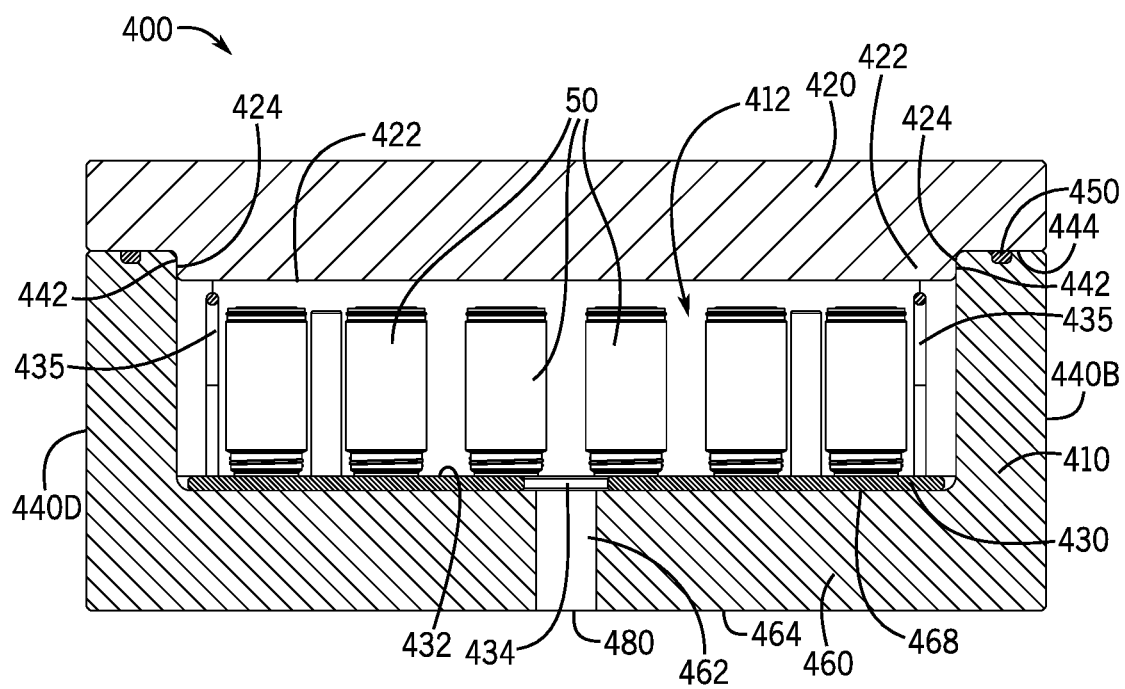
FIG. 8 is a sectional view of the container holding element for holding a plurality of containers.
Figure 9:
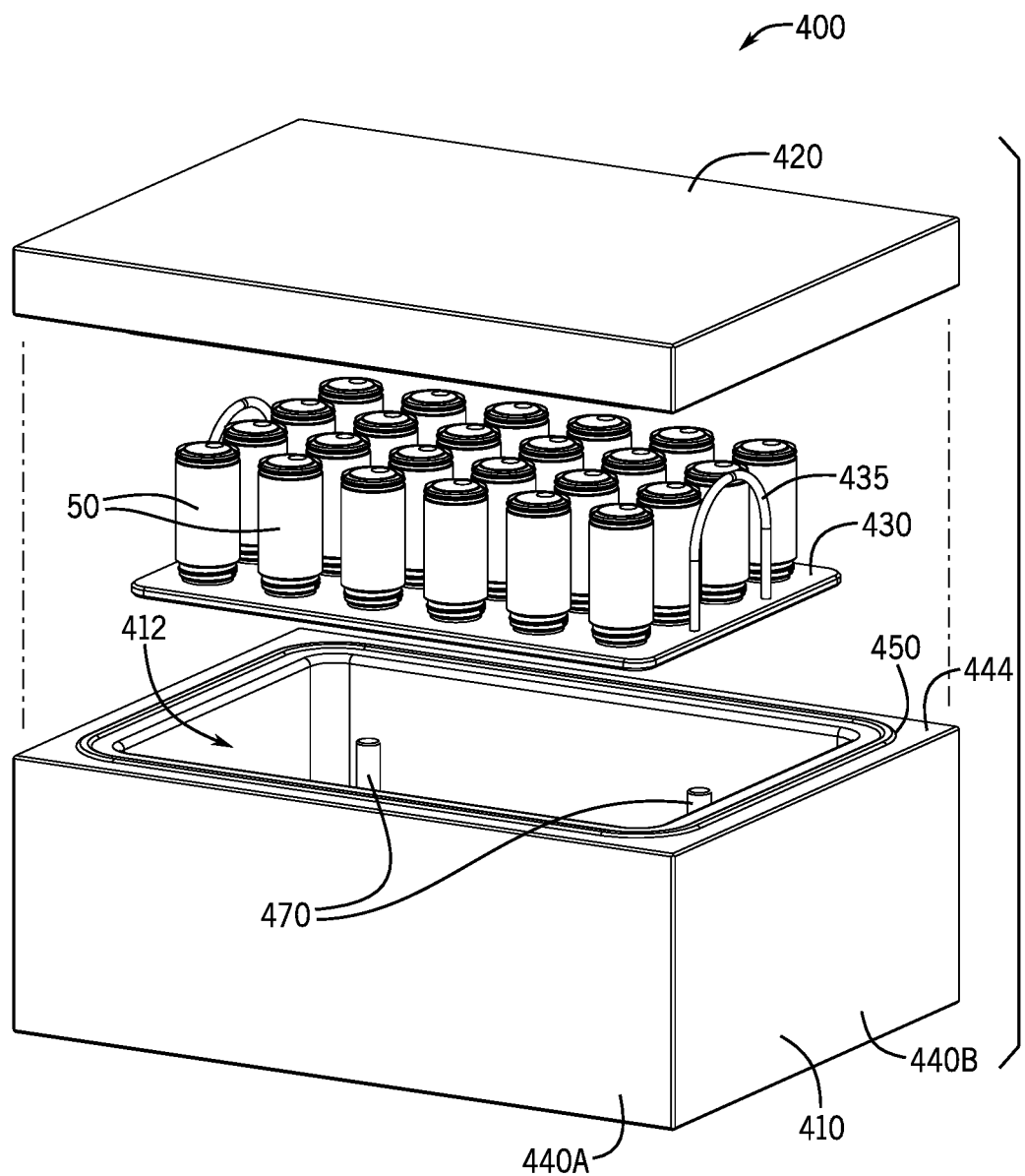
FIG. 9 is an exploded view of the container holding element for holding a plurality of containers.
Figure 10:
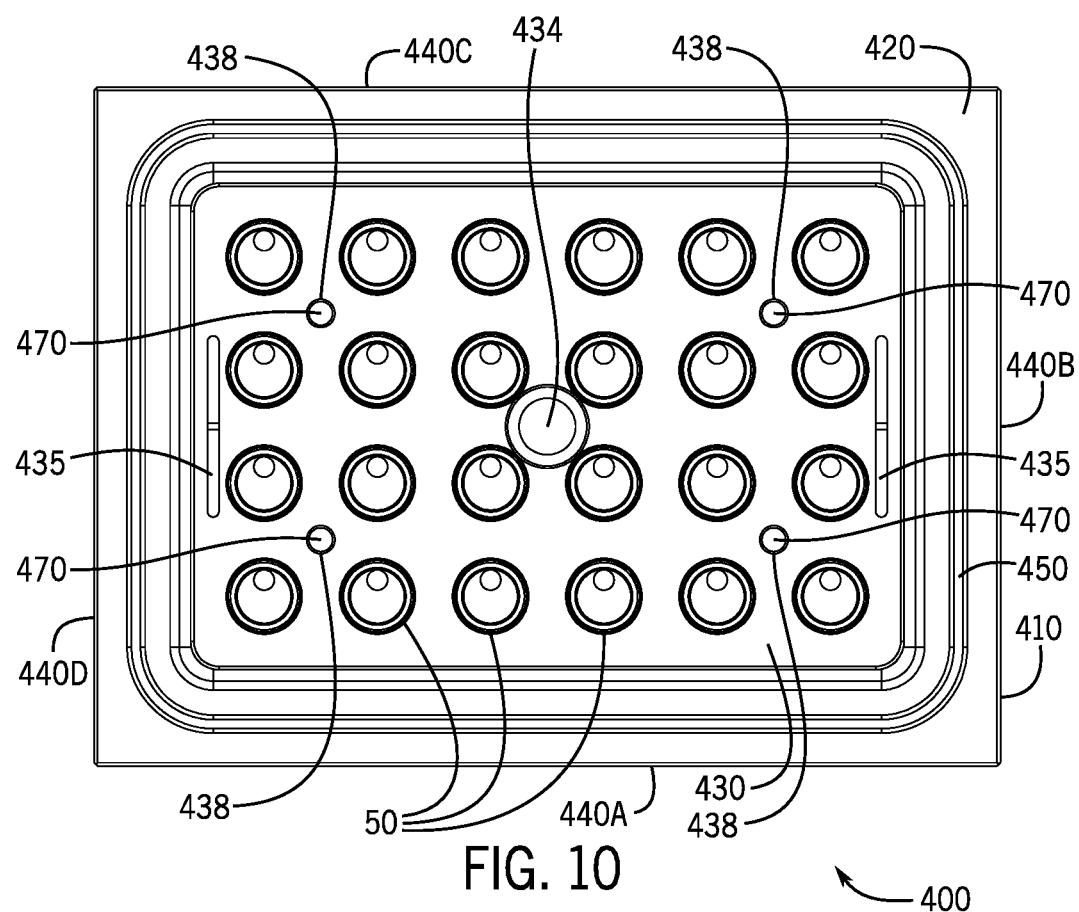
FIG. 10 is a top down view of the container holding element for holding a plurality of containers.

A sectional view of an aspect of the container holding element 400 is shown in FIG. 8 In the illustrated aspect, the bottom 460 of the base 410 includes a vacuum passage 462 passing from a bottom surface 464 of the bottom 460 upwards into the interior 412 of the container holding element 400. The rack 430 includes a vacuum opening 434 to allow air and/or gas to pass from the interior 412 through the vacuum opening 434 and through the vacuum passage 462. As such, a vacuum is drawn through the vacuum passage 462 to lower the air pressure in the interior 412 of the base 410. The bottom surface 464 of the base 410 may include a vacuum port 480 or other fluidic connections or fittings to sealingly engage with a vacuum source, such as the vacuum source 110.

The positioners 470 assist in aligning the rack 430 in a proper position in the base 410. The positioners 470 also assist in aligning the vacuum opening 434 of the rack 430 with the vacuum passage 462. The coordinates or position of the containers 50 on the rack 430 are programmed into the controller 15. The rack 430 fits into the same position in the base 410, due to the positioners 470 and/or an interior shape of the base 410, which assists the controller 15 in locating and/or determining the position of the containers 50 on the rack 430.

The controller 15 operates the system 10. The controller 15 may be programmed via computer numerical control program in order to move the laser source 205 to successive containers 50. A position of each container 50 of the plurality of containers 50 is programmed into the controller 15. The laser source 205 moves from position to position in order to weld the openings. The detector 210 may include a photo-eye, orientation sensor, or other scanner or sensor to ensure that the laser source 205 is in proper position to weld the openings 52. The controller 15 may modulate the positioning of the laser welding assembly 200 based on input from the detector 210. Once the position of the container 50 is verified/confirmed by the detector 210, the controller may activate the laser source 205. The controller 15 also may monitor pressure of the container holding element 400. The controller 15 may be programmed to confirm that the pressure level within the container holding element 400 is acceptable before activating the laser source 205.

Figure 14:
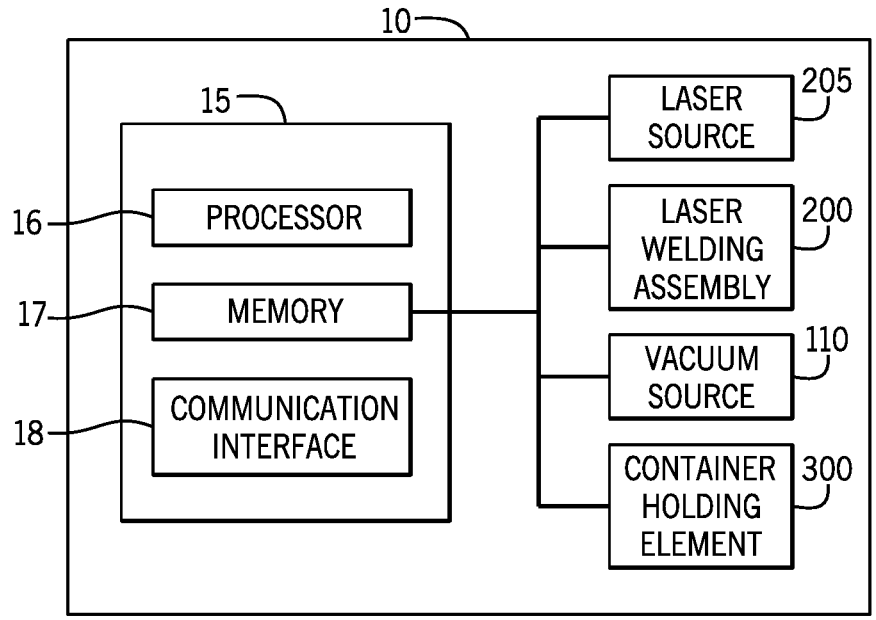
FIG. 14 is a layout of the controller of the system of FIG. 1.

The controller 15 includes at least one processor 16 to process data and a memory 17 to store the data. The processor 16 processes communications, builds communications, retrieves data from the memory 17, and stores data to the memory 17. The processor 16 and the memory 17 are hardware. The memory 17 may include volatile and/or non-volatile memory, e.g., a computer-readable storage medium such as a cache, random access memory (RAM), read only memory (ROM), flash memory, or other memory to store data and/or computer-readable executable instructions such as the computer numerical control instructions or program. With respect to FIG. 14, an exemplary layout of the controller 15 is illustrated with respect to the system 10. As an example, the computer numerical control instructions include position data and may be stored in the memory 17. In addition, the controller 15 further includes at least one communications interface 18 to transmit and receive communications, messages, and/or signals to the laser source 205, laser welding assembly 200, vacuum source 110, and/or container holding element 300, as well as other components, subsystems, and hardware of the system 10, such as, for example, the detector 210, vacuum sensors, position sensors, displays, input controls, drive motors, etc.

The cover 420 fits down over the base 410 to close the container holding element 400. The weight of the cover 420 helps to compress a seal 450 that is positioned at an upper surface 444 of the side walls 440A-440D. The seal 450 may extend all the way around the entirety of the upper surface 444. The cover 420 also includes a flange portion 422 to further help in sealing the interior 412. The flange portion 422 extends downward from the cover 420. An inner flange surface 424 of the flange portion 422 fits against an inner side surface 442 of the side walls 440A-440D. The flange portion 422 helps to properly position and/or align the cover 420 over the base 410. As the vacuum is drawn in the interior 412, the combination of the cover 420, the seal 450, and the flange portion 422 provides for the vacuum to form within the interior 412 of the container holding element 400.

The cover 420 may be formed from a polycarbonate material or other material that allows for passage of laser light from the laser source 205 through the cover 420 and to the containers 50. The cover 420 may be made from any optical glass that allows sufficient light energy from the laser to pass into the interior 412. In the illustrated aspect, the visual detection and laser welding assembly 200 further is positioned over the cover 420, but the visual detection and laser welding assembly 200 may be positioned in any configuration that permits the laser source 205 to send laser light into the container holding element 400. The laser source 205 may move over a top of the cover 420, under direction from the controller 15.

During the forming process, in one aspect, the plurality of unfinished containers 50 are placed completely inside of the container holding element 400. In other aspects, the unfinished containers 50 are positioned only partially in the container holding element 400. With respect to FIG. 8, the unfinished containers 50 are completely enclosed by the container holding element 400. The entirety of the unfinished containers 50 are placed completely inside of the container holding element 400. For example, a container 50 may have a two piece design with an inner shell and an outer shell. During the forming process, both the inner shell and the outer shell may be completely contained inside of the container holding element 400. For example, a four piece design may have an inner shell, an inner bottom shell, an outer shell, and an outer bottom shell. During the forming process, all of the inner shell, the inner bottom shell, the outer shell, and the outer bottom shell may be completely contained inside of the container holding element 400.

In certain aspects, the container holding element 400 may mount over the housing 100 such that the vacuum source 110 of the housing 100 draws vacuum through the vacuum passage 462. Similarly, the visual detection and laser welding assembly 200 may be positioned over a top of the container holding element 400.

Figure 11:
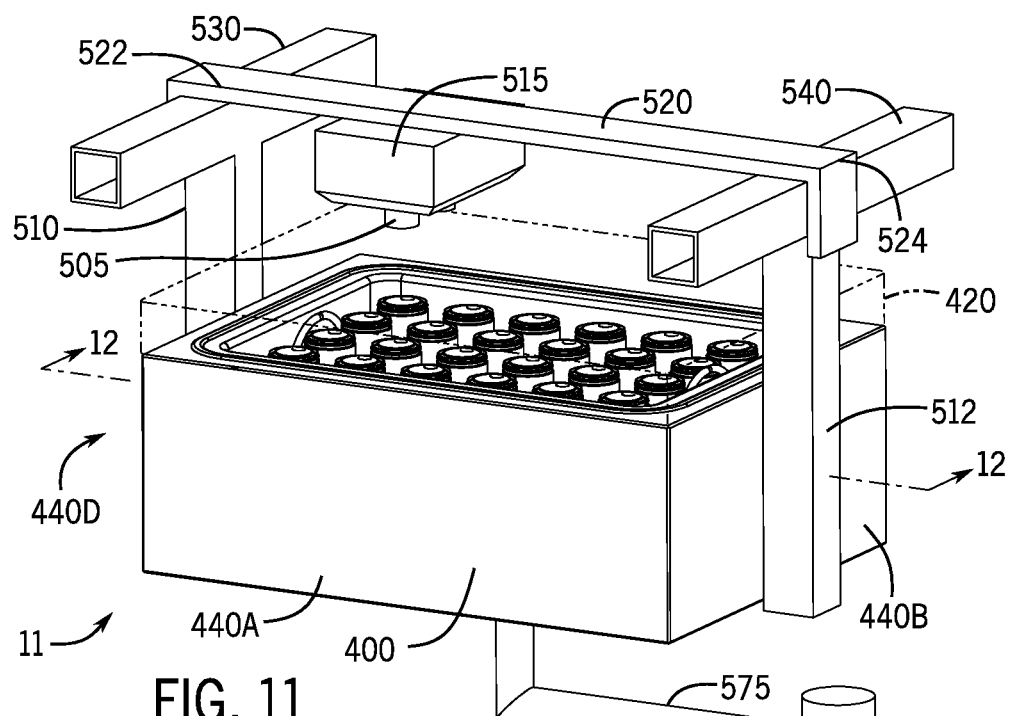
FIG. 11 is perspective view of a second embodiment of the system for forming vacuum insulated containers.
Figure 12:
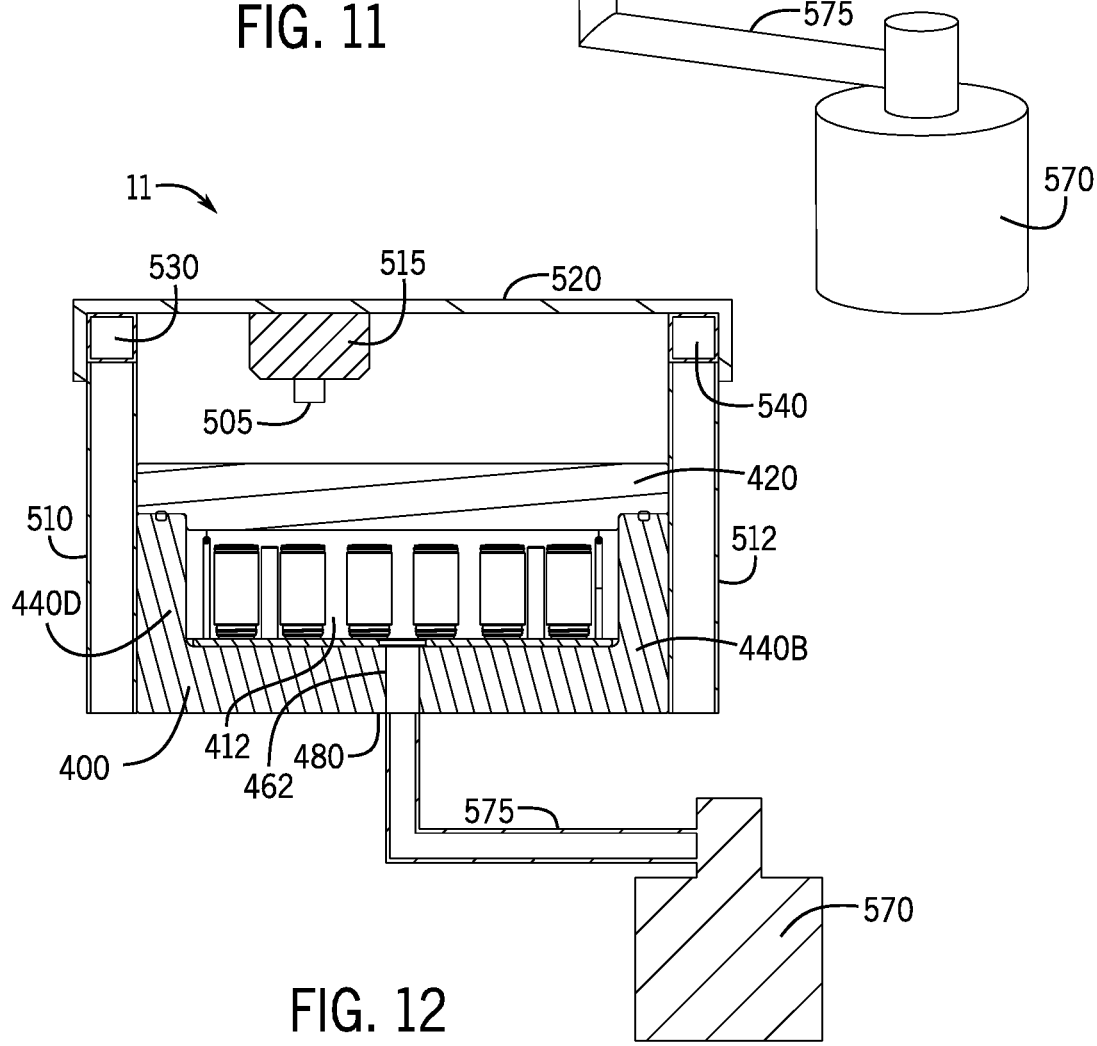
FIG. 12 is sectional view of a second embodiment of the system for forming vacuum insulated containers.
Figure 13:
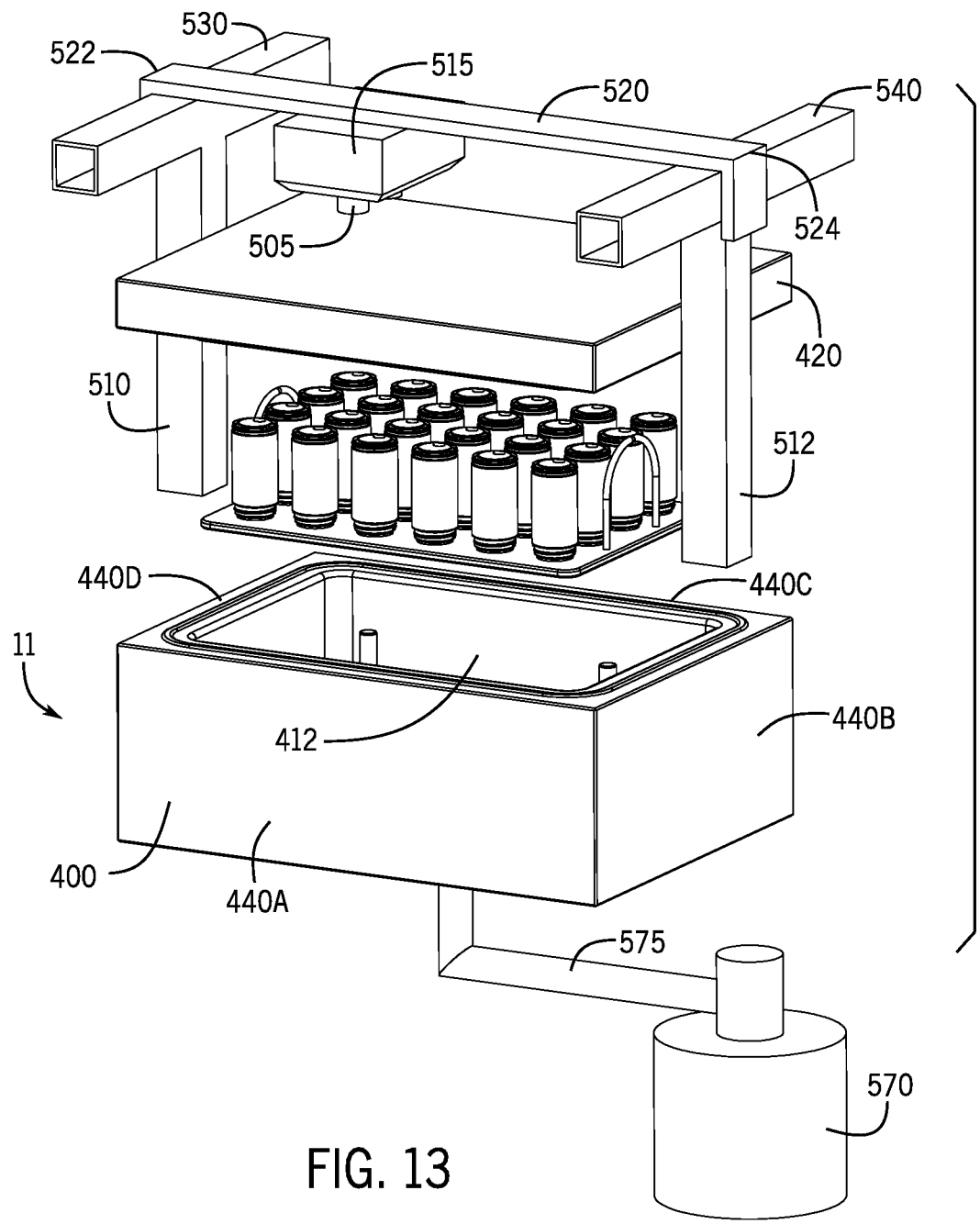
FIG. 13 is an exploded view of a second embodiment of the system for forming vacuum insulated containers.

A system 11 will now be described with reference to FIGS. 11-13. The system 11 directs a laser beam from a laser source 505 through the container holding element 400 of FIGS. 7-10 to weld up the openings 52 in the containers 50 that are within the container holding element 400. The system 11 operates similarly to the system 10, and provide provides many of the same advantages and benefits.

The system 11 includes vertical supports 510 and 512 that support a positioner 515 that operates under computer numerical control program to move the laser source 505 in the X and/or Y directions. In this aspect, the laser source 505 is positioned at an underneath surface of the positioner 515. The laser source 505 may be integrated to the positioner 515. The positioner 515 is movably engaged to a central support 520 that maintains the positioner 515 above the container holding element 400. In this aspect, the central support 520 is positioned generally parallel to the sidewalls 440A and 440C, and the positioner 515 moves along a length of the central support 520 in the X direction.

Ends 522 and 524 of the central support 520 are movably engaged to horizontal supports 530 and 540. The vertical supports 510 and 512 support the horizontal supports 530 and 540. In this aspect, the horizontal supports 530 and 540 are positioned generally parallel to sidewalls 440B and 440D, and the central support 520 moves along a length of the horizontal supports 530 and 540 in the Y direction.

In the embodiment shown, the positioner 515 travels along the X axis via the central support 520, while the central support 520 moves along the Y axis via the movable engagement between the central support 520 and the horizontal supports 530 and 540. The positioner 515 moves relative to the central support 520, and the central support 520 moves relative to the horizontal supports 530 and 540. Of course, in other embodiments, the arrangement of travel may be reversed or altered. Also, in this embodiment, the height of the positioner 515 is generally fixed. Of course, in other embodiments, the height of the positioner 515 is adjustable or may be under computer numerical control program. For example, the vertical supports 510 and 512 may extend or retract to adjust the height of the positioner 515.

The vertical supports 510 and 512 may attach or engage to outer surfaces of the side walls 440B and 440D of the container holding element 400 to provide support and stability to the system 11. In other aspects, the container holding element 400 may be removably placed between the vertical supports 510 and 512. In other aspects, the vertical supports 510 and 512 are positioned proximate the container holding element 400.

A vacuum source 570, such as a pump, draws the vacuum in the system 11. The vacuum source 570 is engaged to the vacuum port 480 of the vacuum fixture 400 via a vacuum line 575. As such, a vacuum is drawn by the vacuum source 570, through the vacuum line 575, through the vacuum passage 462 to lower the air pressure in the interior 412 of the base 410.

The system 11 may include the controller 15 of FIGS. 1-6B or other suitable programmable logic controller to operate at least certain elements of the system 11. For example, the controller 15 may cause turning on, turning off, moving the positioner 515 relative to the central support 520, moving the central support 520 relative to the horizontal supports 530 and 540, calibrating or otherwise directing any or all of the laser source 505, the vacuum source 570, or other components of the system 11.

Figure 15:
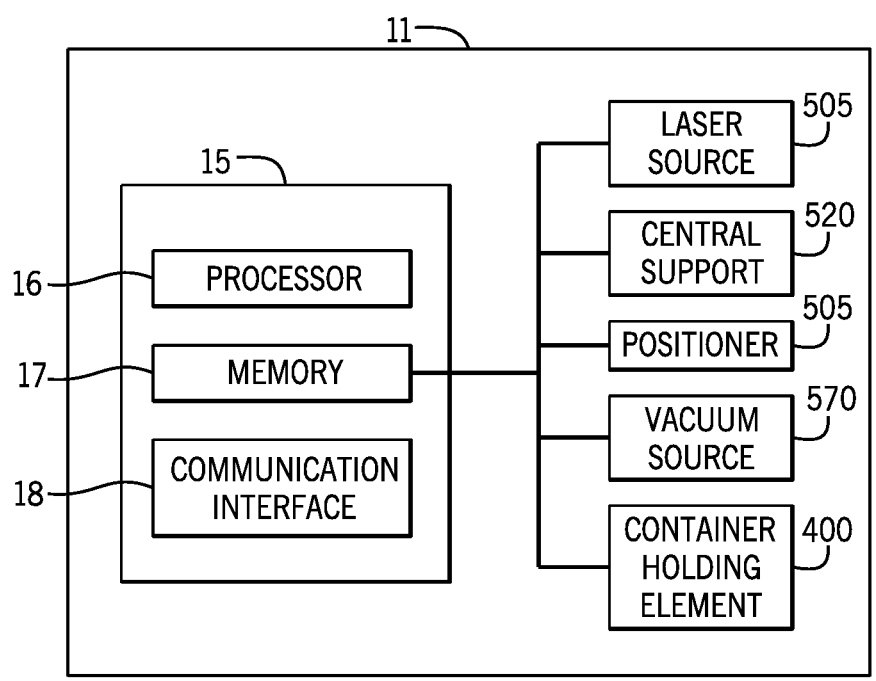
FIG. 15 is a layout of the controller of the system of FIGS. 11-13.

With respect to FIG. 15, an exemplary layout of the controller 15 is illustrated with respect to the system 11. The controller 15 includes the least one processor 16 to process the data and the memory 17 to store the data. The processor 16 processes communications, builds communications, retrieves data from the memory 17, and stores data to the memory 17. The controller 15 further includes the at least one communications interface 18 to transmit and receive communications, messages, and/or signals to the laser source 505, central support 520, positioner 505, vacuum source 570, and container holding element 400, as well as other components, subsystems, and hardware of the system 11, such as, for example, detectors, vacuum sensors, position sensors, displays, input controls, drive motors, etc.

In the aspects illustrated in FIGS. 1-13, the unfinished containers 50 are placed completely inside of the container holding element 300 or are placed completely inside of the container holding element 400. The systems 10 and 11 and methods described herein may also be used with container holding elements that only partially enclose the unfinished containers 50. For example, certain container holding elements will seal to or engage with portions of unfinished containers 50. For example, certain container holding elements will seal over or enclose portions of the unfinished containers having the openings 52, and then draw the vacuum to form the vacuum within the space between the inner shell and the outer shell, while other portions of same unfinished containers are not enclosed by the container holding element.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A method for forming a vacuum insulated container, comprising:
   joining an inner shell and an outer shell together to form a container, wherein the container has a space between the inner shell and the outer shell;
   cutting one or more openings in any surface of the container;
   placing the entire container inside of a container holding element;
   drawing a vacuum within the container holding element and around the container by lowering a pressure around the container to a desired level, and thereby pulling a vacuum through the one or more openings; and,
   directing a laser beam through a wall of the container holding element and welding closed the one or more openings to seal the vacuum in the space between the inner shell and the outer shell to form a vacuum space between the inner shell and the outer shell.

2. The method for forming a vacuum insulated container according to claim 1, further comprising lowering the pressure around the container to the desired level without adding additional heat.

3. The method for forming a vacuum insulated container according to claim 1, further comprising lowering the pressure around the container to the desired level at ambient temperature conditions.

4. The method for forming a vacuum insulated container according to claim 1, further comprising cutting the one or more openings in a bottom surface of the outer shell or an upward facing bottom surface of the inner shell.

5. The method for forming a vacuum insulated container according to claim 1, further comprising cutting the one or more openings in a side surface of the outer shell.

6. The method for forming a vacuum insulated container according to claim 1, wherein the vacuum insulated container is configured as a beverage container or a food container.

7. The method for forming a vacuum insulated container according to claim 1, wherein the one or more openings are positioned along or in an edge of the container.

8. The method for forming a vacuum insulated container according to claim 1, further comprising providing a laser source that directs the laser beam through a window of the container holding element, and subsequently, moving the laser source to direct the laser beam into another container holding element.

9. The method for forming a vacuum insulated container according to claim 1, further comprising heating the container prior to placing the container in the container holding element.

10. The method for forming a vacuum insulated container according to claim 1, further comprising opening the container holding element, placing the container in a positioner inside of the container holding element, and closing the container holding element.

11. The method for forming a vacuum insulated container according to claim 1, further comprising moving a source of the laser to a second container holding element containing a second container, and sealing openings of the second container closed while a vacuum condition is present in the second container holding element.

12. A vacuum insulated container formed by the method of claim 1.

13. The method for forming a vacuum insulated container according to claim 1, further comprising cutting the one or more openings in the outer shell.

14. The method for forming a vacuum insulated container according to claim 1, further comprising cutting the one or more openings after the joining of the inner shell and the outer shell together to form the container.

15. The method for forming a vacuum insulated container according to claim 1, further comprising joining a bottom shell with the inner shell and the outer shell to form the container.

16. The method for forming a vacuum insulated container according to claim 15, further comprising cutting the one or more openings in the bottom shell after the joining of the bottom shell with the inner shell and the outer shell to form the container.

17. The method for forming a vacuum insulated container according to claim 16, further comprising joining another bottom shell over the bottom shell and covering the one or more openings that were welded closed.

18. The method for forming a vacuum insulated container according to claim 1, further comprising placing the entire container completely inside of the container holding element.

19. The method for forming a vacuum insulated container according to claim 1, wherein the container is assembled before being placed inside of the container holding element.

20. A method for forming a vacuum insulated container, comprising:
   joining an inner shell, an outer shell, and a bottom shell together to form a container, wherein the container has a space between the inner shell and the outer shell;
   cutting one or more openings in the bottom shell after the joining of the inner shell, the outer shell, and the bottom shell;
   placing the entire container inside of a container holding element;
   drawing a vacuum within the container holding element and around the container by lowering a pressure around the container to a desired level, and thereby pulling a vacuum through the one or more openings;
   directing a laser beam through a wall of the container holding element; and
   welding closed the one or more openings to seal the vacuum in the space between the inner shell and the outer shell to form a vacuum space between the inner shell and the outer shell.

21. A method for forming a vacuum insulated container, comprising:
   joining an inner shell and an outer shell;
   forming an intershell space between the inner shell and the outer shell;
   joining a bottom shell to the inner shell and the outer shell to form a container;
   cutting one or more openings the bottom shell or the outer shell of the container after the joining of the bottom shell to the inner shell and the outer shell;
   placing the container completely inside of a container holding element;
   drawing a vacuum within the container holding element and around the container by lowering a pressure around the container to a desired level, and thereby pulling a vacuum through the one or more openings;

directing a laser beam through a wall of the container holding element; and welding closed the one or more openings to seal the vacuum in the intershell space.

22. The method for forming a vacuum insulated container according to claim 21, further cutting one or more openings in the outer shell of the container at a side surface of the container.

23. A method for forming a vacuum insulated container, comprising:

joining an inner shell, an outer shell, and a bottom shell together to form an assembled container, wherein the assembled container has a space between the inner shell and the outer shell;

cutting one or more openings in any surface of the assembled container;

placing the entire assembled container inside of a container holding element;

drawing a vacuum within the container holding element and around the assembled container by lowering a pressure around the assembled container to a desired level, and thereby pulling a vacuum through the one or more openings; and, directing a laser beam through a wall of the container holding element thereby welding closed the one or more openings to seal the vacuum in the space between the inner shell and the outer shell to form a vacuum space between the inner shell and the outer shell.

24. A method for forming a vacuum insulated two-piece container, comprising:

joining an inner shell and an outer shell together to form a two-piece container, wherein the two-piece container has a space between the inner shell and the outer shell;

cutting one or more openings in any surface of the two-piece container;

placing the entire two-piece container inside of a container holding element; drawing a vacuum within the container holding element and around the two-piece container by lowering a pressure around the two-piece container to a desired level, and thereby pulling a vacuum through the one or more openings; and, directing a laser beam through a wall of the container holding element and welding closed the one or more openings to seal the vacuum in the space between the inner shell and the outer shell to form a vacuum space between the inner shell and the outer shell.

25. The method for forming a vacuum insulated two-piece container according to claim 24, further comprising joining the inner shell and the outer shell together to form the two-piece container before cutting the one or more openings in any surface of the two-piece container.

* * * * *